US010459129B2

(12) United States Patent
Montagne

(10) Patent No.: US 10,459,129 B2
(45) Date of Patent: Oct. 29, 2019

(54) LIGHT DIFFUSER BETWEEN TWO PLATES WITH VARYING PROPERTIES

(71) Applicant: PHILIPS LIGHTING HOLDING B.V., Eindhoven (NL)

(72) Inventor: Louis-Xavier Marie Montagne, Lyons (FR)

(73) Assignee: SIGNIFY HOLDING B.V., Eindhoven (NL)

(*) Notice: Subject to any disclaimer, the term of this patent is extended or adjusted under 35 U.S.C. 154(b) by 181 days.

(21) Appl. No.: 15/526,775

(22) PCT Filed: Nov. 17, 2015

(86) PCT No.: PCT/EP2015/076733
§ 371 (c)(1),
(2) Date: May 15, 2017

(87) PCT Pub. No.: WO2016/079074
PCT Pub. Date: May 26, 2016

(65) Prior Publication Data
US 2017/0322350 A1    Nov. 9, 2017

(30) Foreign Application Priority Data

Nov. 20, 2014 (EP) .................................... 14306843

(51) Int. Cl.
*G02B 5/02* (2006.01)
*F21V 5/00* (2018.01)
(Continued)

(52) U.S. Cl.
CPC ............ *G02B 5/0247* (2013.01); *F21V 5/002* (2013.01); *F21V 5/004* (2013.01); *F21V 14/06* (2013.01);
(Continued)

(58) Field of Classification Search
CPC .. G02B 5/0247; G02B 5/0221; G02B 5/0278; G02B 26/004; G02B 5/0242;
(Continued)

(56) References Cited

U.S. PATENT DOCUMENTS 4,093,351 A    6/1978   Perkins et al.
4,444,471 A *  4/1984   Ford, Jr. ............ G02B 26/0875
                                              359/666

(Continued)

FOREIGN PATENT DOCUMENTS

EP    2971060 A1    8/2012
EP    27696783 A1   10/2014
(Continued)

*Primary Examiner* — Anh T Mai
*Assistant Examiner* — Michael Chiang
(74) *Attorney, Agent, or Firm* — Daniel J. Piotrowski

(57) ABSTRACT

The invention relates to a light diffuser (1) comprising a light diffusing element (10), wherein the light diffusing element (10) comprises a flexible translucent material, the light diffuser (1) comprising a first plate (11) and a second plate (13), said first (11) and second (13) plates being rigid and translucent, the light diffusing element (10) being arranged between said first (11) and second (13) plates in such a way that one first face of the light diffusing element (10) is coupled with the first plate (11), and one second face of the light diffusing element (10) is coupled with the second plate (13), at least one of said first or second face comprising a plurality of cavities or excrescences. Such a light diffuser is easily adaptable and can for example be mounted in a luminaire.

13 Claims, 6 Drawing Sheets

(51) Int. Cl.
*F21V 14/06* (2006.01)
*G02B 26/00* (2006.01)

(52) U.S. Cl.
CPC ......... *G02B 5/0221* (2013.01); *G02B 5/0278* (2013.01); *G02B 26/004* (2013.01)

(58) Field of Classification Search
CPC ...... G02B 5/0236; G02B 5/0205; G02B 5/02; G02B 5/021; F21V 5/002; F21V 5/004; F21V 14/06; F21V 5/005
See application file for complete search history.

(56) References Cited

U.S. PATENT DOCUMENTS

| | | | |
|---|---|---|---|
| 4,783,155 A * | 11/1988 | Imataki | G02B 3/14 359/666 |
| 5,109,300 A | 4/1992 | Waddell | |
| 8,553,341 B2 | 10/2013 | Aschwanden | |
| 8,632,217 B2 * | 1/2014 | Zeng | F21L 4/005 362/277 |
| 2003/0214717 A1 | 11/2003 | Kaminsky et al. | |
| 2003/0214812 A1 * | 11/2003 | Bourdelais | G02B 5/0221 362/330 |
| 2008/0205035 A1 | 8/2008 | Asvadi et al. | |
| 2010/0079869 A1 | 4/2010 | Inoue et al. | |
| 2011/0069392 A1 | 3/2011 | Yamazaki et al. | |
| 2014/0104690 A1 * | 4/2014 | Sandre-Chardonnal | B32B 17/10 359/599 |

FOREIGN PATENT DOCUMENTS

| | | |
|---|---|---|
| WO | 2008076410 A1 | 6/2008 |
| WO | 2014013389 A1 | 1/2014 |

* cited by examiner

LIGHT DIFFUSER BETWEEN TWO PLATES WITH VARYING PROPERTIES

CROSS-REFERENCE TO PRIOR APPLICATIONS

This application is the U.S. National Phase application under 35 U.S.C. § 371 of International Application No. PCT/EP2015/076733, filed on Nov. 17, 2015 which claims the benefit of European Patent Application No. 14306843.5, filed on Nov. 20, 2014. These applications are hereby incorporated by reference herein.

FIELD OF THE INVENTION

The present invention relates generally to optical devices, and more particularly to a light diffuser, notably for use in a lighting device, such as a luminaire. In some aspects of the invention, the light diffuser is adapted to have variable light diffusing properties.

BACKGROUND

Light diffusers are widely used in lighting devices, for example in luminaires, and allow spreading out or scattering light in a desired manner, to provide a diffused light, for example better adapted to a uniform lighting.

Static and uniform light diffusers are well known, which can be based from diffusing reflectors, or translucent devices for example made with ground glass.

In most applications it can however be desirable that a light diffuser is configured for being easily adaptable, that is: a light diffuser having adjustable light diffusing properties. Such light properties include light diffusion, glare and beam width or full width at half maximum, commonly designated by the acronym FWHM. The ability to adjust all these light properties for a luminaire is highly desirable.

U.S. Pat. No. 8,553,341 B2 relates to an electro-active optical device comprising a deformable polymer film substrate and a rigid optical element, which in one embodiment is a diffusing structure, provided on the substrate. Electrodes are connected to the substrate in order to enable deformation of the substrate, which in turn enables the rigid element to be displaced in the place of the substrate.

Published international patent application WO 2014/013389 relates to a diffuser comprising a partially transparent first layer and an adjoining transparent second layer, the first layer being continuous and comprising a stretchable elastomer, the second layer being a segmented layer comprising a material with a high effective stiffness measured as the product of the thickness of the material and the elastic modulus of the material.

The light diffusers described in the two references above however involve complex hardware structures that are not necessarily easy to design and assemble in production, and further involve active actuators to act on a stretchable structure by means of electrodes. Also, such structures are relatively thick, which makes it difficult to easily integrate them in luminaires without affecting compactness or cosmetic aspect thereof.

SUMMARY OF THE INVENTION

It is an object of the present invention to provide a light diffuser having a simple and cheap design, while being easy to adjust. Another advantage of a light diffuser according to different aspects of the invention, is that it is significantly thinner in comparison with light diffuser known in the prior art, making its integration in compact luminaires much easier.

The invention is defined by the claims.

According to an example, there is provided a light diffuser comprising a light diffusing element, wherein the light diffusing element comprises a flexible translucent material, the light diffuser comprising a first plate and a second plate, said first and second plates being rigid and translucent, the light diffusing element being arranged between said first and second plates in such a way that one first face of the light diffusing element is coupled with the first plate, and one second face of the light diffusing element is coupled with the second plate, at least one of said first or second face comprising a plurality of cavities and/or excrescences.

One advantage of such a configuration of a light diffuser, basically consisting of a sandwiched structure, is that it has a simple structure that can be made at a relatively low production cost, notably in comparison with light diffuser structures known in the prior art as described above. The number of required elements is low and the making of the light diffusing element, simply formed by a piece of flexible material comprising cavities or excrescences is easy and cheap.

In an embodiment of the invention, the first and second plates are adapted to be moved closer to or further away from each other.

Such an embodiment provides a simple way to adapt the light diffusion properties of the light diffuser, simply through varying the distance between the two plates.

In an embodiment of the invention, at least one of said first or second face can comprise a plurality of cavities of random depth and/or excrescences of random height.

In embodiments of the invention, the flexible translucent material can comprise silicone rubber.

Yet in other embodiments of the invention, said first and second plates can be made with transparent glass.

Yet in other embodiments of the invention, said first and second plates can be essentially planar.

In other embodiments of the invention, at least one of said first or second plate can have a lens shape.

In other embodiments of the invention, the light diffuser can further comprise a motive element configured for varying the distance between said first plate and second plate. Said motive element can for example comprise a first threaded cylinder attached to the first plate, and a second threaded cylinder attached to the second plate, the threaded cylinders comprising matching threading portions.

Another aspect of the invention is a luminaire comprising a housing, a light source, and a light diffuser as in any of the described embodiments. The luminaire can for example further comprise a motor engine for varying the distance between the first and second plates. The luminaire can for example further comprise a driving circuitry and a power supply for operating at least the motor engine.

The luminaire can further comprise communication means for receiving control signals into signals for adjusting operation of the motor engine through varying the operating parameters of the associated driving circuits.

Another aspect of the invention is a method for varying the diffusion properties of light passing through a light diffuser, comprising the steps of:

providing a light diffuser comprising a light diffusing element having a first main surface coupled with a first rigid translucent plate and a second main surface coupled with a second rigid translucent plate, at least one of said main surfaces of the light diffusing element comprising a plurality of cavities or excrescences;

varying the distance between said first plate and said second plate, thereby varying light diffusion properties of the light diffuser.

BRIEF DESCRIPTION OF THE DRAWINGS

Examples of the invention will now be described in detail with reference to the accompanying drawings, in which.

DETAILED DESCRIPTION

Figure 1:
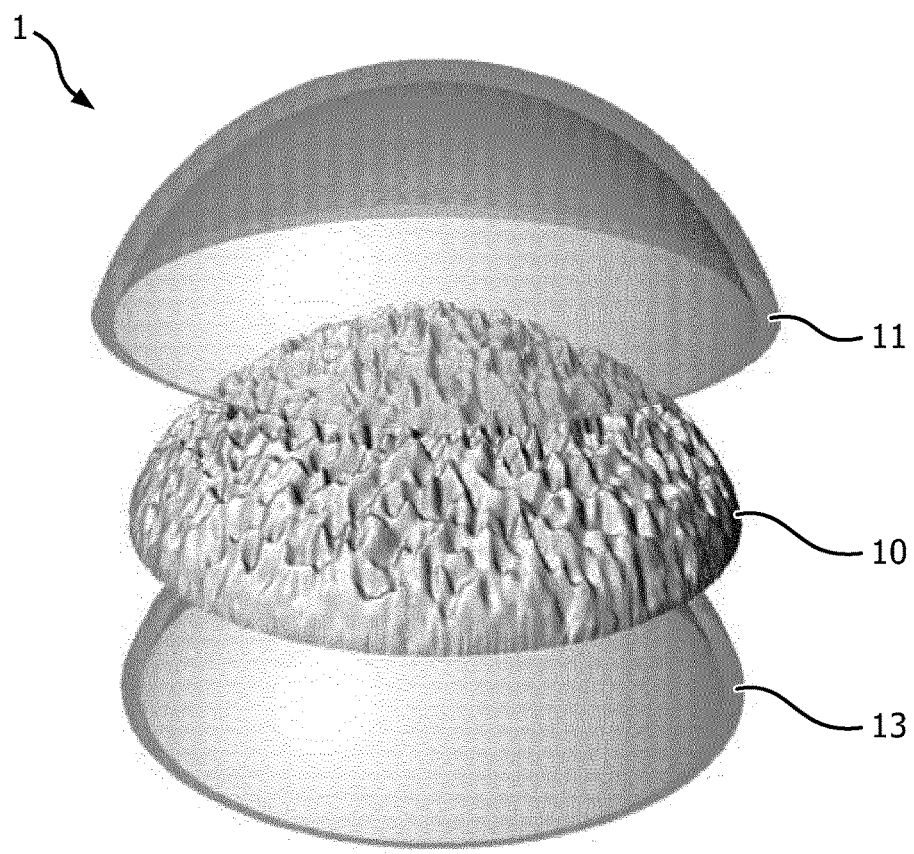
FIG. 1 shows a first exemplary embodiment of a light diffuser according to the invention.

FIG. 1 shows a perspective view of a first exemplary embodiment of a light diffuser 1 according to the invention. In the non-limiting exemplary embodiment illustrated by FIG. 1, the light diffuser 1 comprises a light diffusing element 10 that is arranged between a first plate 11 and a second plate 13.

Still in a non-limiting manner, the shape of the first and second plates 11, 13 can be essentially that of a portion of a sphere. Thanks to the flexible structure of the light diffusing element 10, the shape of the light diffusing element 10 adopts the same shape as that of the first and second plates 11, 13, though it is preferred that the global shape of the light diffusing element alone, that is: when not arranged between the first and second plates 11, 13, is essentially similar to the shape of the first and second plates 11, 13.

In other embodiments, such as for instance the second exemplary embodiment described hereinafter in reference to FIG. 3, the first and second plates 11, 13 as well as the light diffusing element 10 can be essentially planar.

The first plate 11 and the second plate 13 can be transparent, partly transparent, or translucent. Similarly, the light diffusing element 10 can be transparent, partly transparent, or translucent. For the sake of simplicity the word "translucent" will be preferred in the following description.

The first plate 11 and the second plate 13 can be made of a rigid material. For example, the first plate 11 and the second plate 13 can be made of transparent or ground glass, poly-(methyl methacrylate) (PMMA), or any polymeric, organic or inorganic material having adequate properties of rigidity and light transparency.

In simple embodiments, the first plate 11 and/or the second plate 13 can have simple structures, basically having two surfaces that are substantially parallel with each other, as in the illustrated exemplary embodiments. However this is not required and it can be preferred that the first plate 11 and/or the second plate 13 have more complex structures. For example, the first plate 11 and/or the second plate 13 can be lens-shaped, in order to act as light beam shapers, so that the light diffuser 1 not only allows diffusing light, but also allows forming a light beam with a desired shape. A person of ordinary skill in the art in the field of optical devices will be able to easily design appropriate lens shapes in order to achieve a desired light beam pattern.

The light diffusing element 10 can comprise a translucent flexible material. For example, the light diffusing element 10 can be made of silicone rubber having adequate elasticity properties and adequate transparency properties. Good results can be obtained with a refractive index between 1.40 and 1.43 and an optical transmission higher than 90% in the visible range.

The light diffusing element 10 is arranged between the first and second plates 11, 13 in such a way that one first main surface of the light diffusing element 10 (the upper surface in FIG. 1) is coupled with the first plate 11, and one second main surface of the light diffusing element 10 (the bottom surface in FIG. 1) is coupled with the second plate 13.

The sandwiched structure formed by the light diffusing element 10 and the first and second plates 11, 13 enables easy adjustment of the light diffusion properties of the light diffuser 1. Indeed, thanks to the structure of the light diffusing element described in detail hereinafter in reference to FIG. 2, as the pressure induced by the first and second plates 11, 13 is being varied, the light diffusion properties of the light diffusing element 10 are being varied accordingly.

Figure 2:
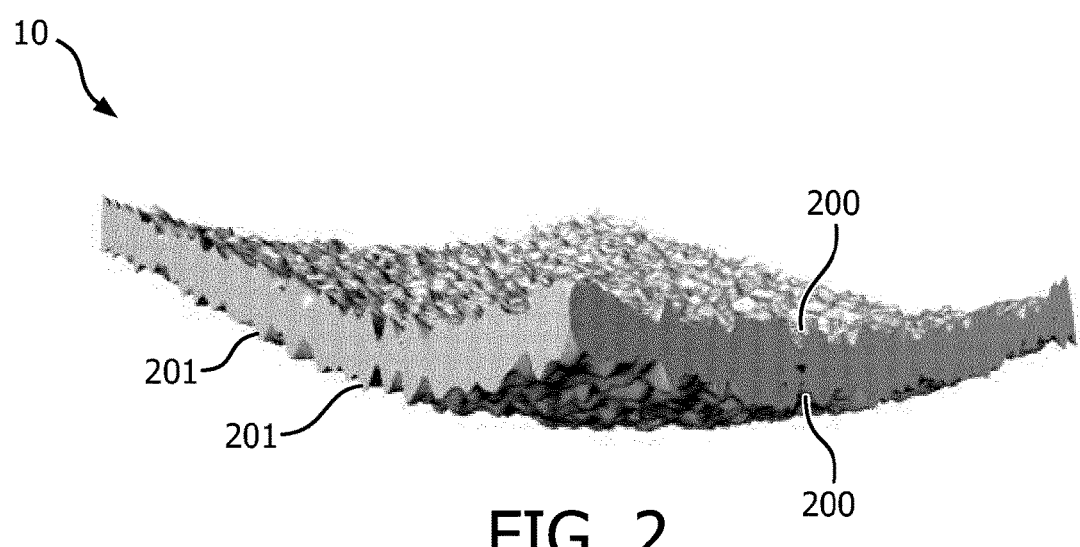
FIG. 2 shows a light diffusing element, in an exemplary embodiment of the invention.

FIG. 2 shows a perspective view of a light diffusing element, in an exemplary embodiment of the invention.

According to a specificity of the present invention, the light diffusing element 10 is configured in such a way that at least one of its surfaces that are adapted to be in contact with the first or second plates 11, 13, has a surface condition, for instance a surface roughness, which is such that it presents a plurality of cavities 200. In the non-limiting example illustrated by FIG. 2, both main surfaces of the light diffusing element 10 comprise a plurality of cavities 200 and excrescences 201. In other embodiments that are not depicted in the figures, only one of the two main surfaces of the light diffusing element 10 can comprise such cavities 200 or excrescences 201.

For the sake of simplicity, it can be considered that a main surface of the light diffusing element 10 simply comprises a plurality of cavities 200. The other way round, it can be considered that a main surface of the light diffusing element 10 simply comprises a plurality of excrescences 201.

Thereby, it is possible, by adjusting the distance between the first and second plates 11, 13, or the pressure exerted by the first and second plates 11, 13 onto the corresponding main surfaces of the light diffusing element 10, to more or less crush the excrescences 201 against corresponding portions of the first plate 11 or second plate 13 facing the excrescences 201.

The plurality of cavities 200 and/or excrescences 201 can be arranged according to a regular, or at least predetermined pattern, for example by means of additional manufacturing steps after a piece of flexible material to form the light diffusing element 10 has been realized. For example, a plurality of cavities 200 can be realized by means of a drilling process applied to a mould allowing making the diffusing element 10. In other embodiments, the surface condition of such mould can be altered for the purpose of forming cavities in the diffusing element 10, for example by means of chemical or mechanical erosion processes. Similarly, the surface condition of the diffusing element 10 itself can be altered by similar processes.

The light diffusing element 10 with its cavities 200 and/or excrescences 201 can be realized by means of a typical moulding process, such as injection moulding or pouring.

In other embodiments, as illustrated by the figures, the configuration and distribution of the cavities 200 and/or excrescences 201 can be random. In such embodiments, light diffusion properties of the light diffuser 1 can still well be adjusted, as globally, the plurality of cavities 200 and/or excrescences 201 will provide acceptable light diffusion properties. Such embodiments offer the advantage of requiring simplified manufacturing processes, thereby involving low manufacturing costs.

Figure 3:
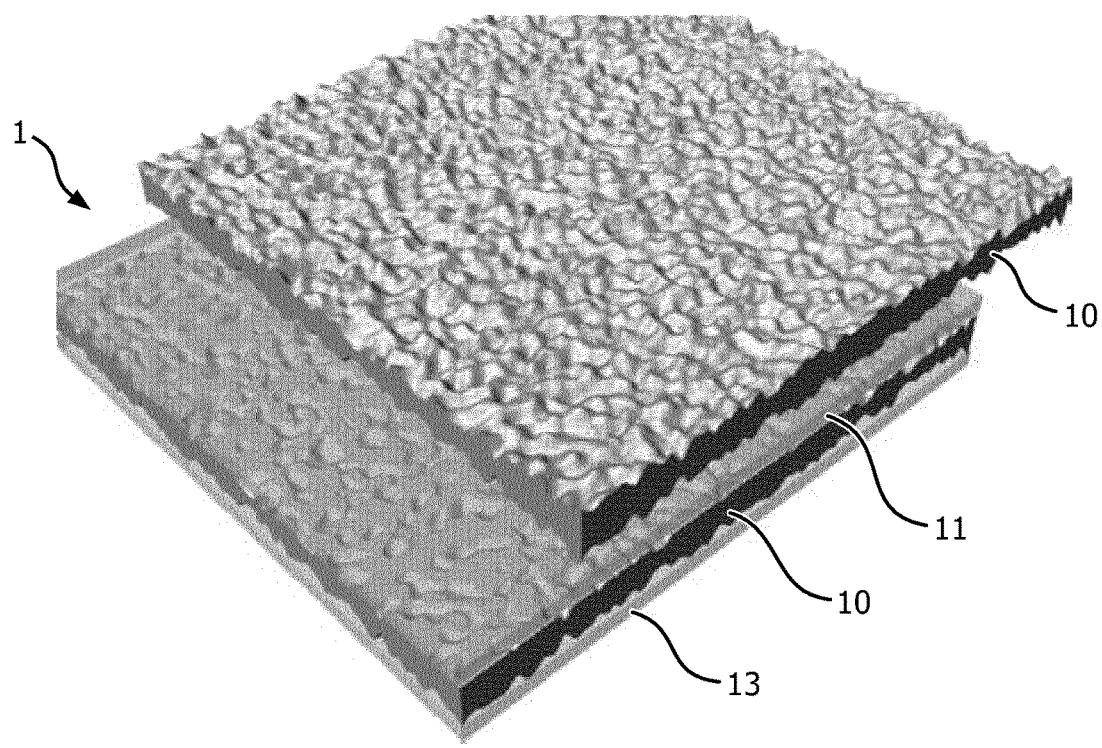
FIG. 3 shows a zoomed-in portion of a light diffusing element, respectively separate from the light diffuser and comprised by a light diffuser, as in a second exemplary embodiment of the invention.

FIG. 3 shows a perspective view of a zoomed-in portion of a light diffusing element, respectively separate from the light diffuser and comprised by a light diffuser, as in a second exemplary embodiment of the present invention.

The top part of FIG. 3 illustrates a light diffusing element 10 that is separate from the light diffuser structure 1, in all ways similar to the light diffusing element 10 described above in reference to FIG. 2.

The bottom part of FIG. 3 illustrates a light diffuser 1, wherein the light diffusing element 10 is gently compressed between the first and second plates 11, 13. In this configuration, some of the excrescences 201, namely: the tallest of the excrescences 201, have their free end that is being crushed by the facing portion of the corresponding plate, and therefore have a flat shape, which does not significantly affect the direction of light rays coming through. The changes of the refractive indices of the parts of the diffuser 1 the light passes through is indeed determining for the trajectories of light rays, thereby global light diffusion properties of the light diffuser 1, as described in more detail hereinafter, notably in reference to FIG. 4B. Light rays can pass through the following media in many different possible orders, exemplified hereafter in reference to FIG. 4B: the material that forms either one of the plates, the material comprised by the internal volume of the cavities 200, or the material forming the light diffusing element 10.

Figure 4A:
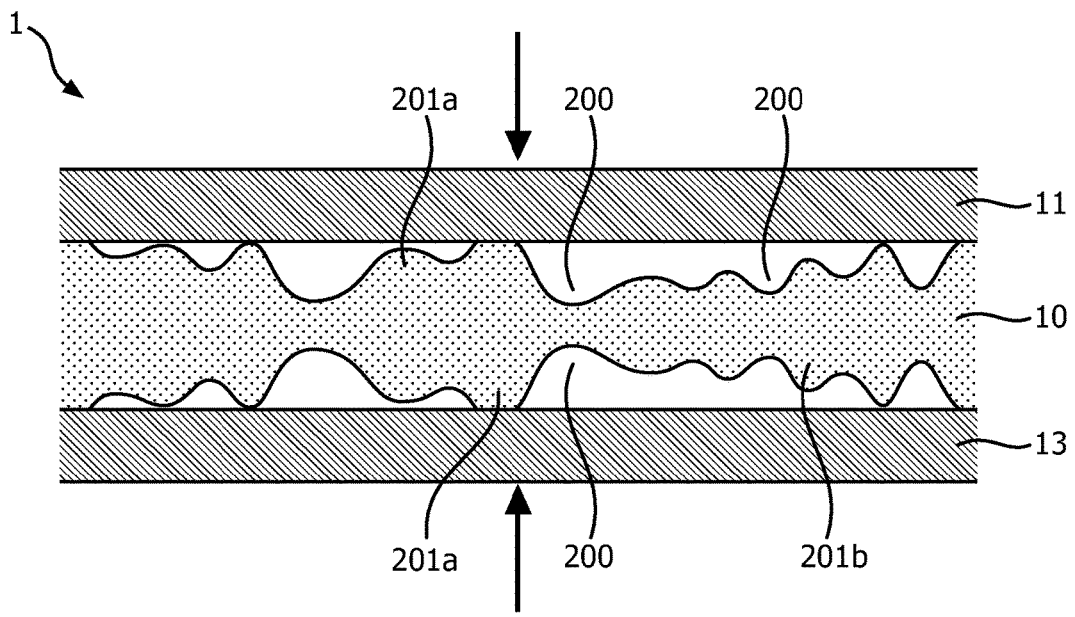
FIGS. 4A and 4B show respectively a zoomed-in portion of a light diffuser according to the second exemplary embodiment, as light diffusion is being varied, and a simplified section view thereof showing the trajectories of light rays.
Figure 4B:
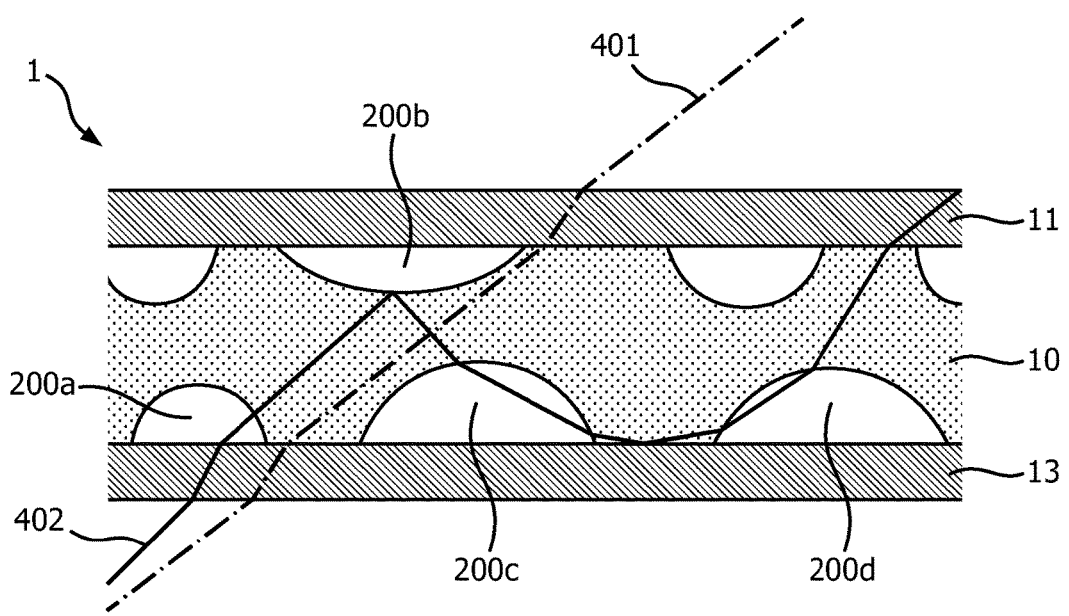

FIGS. 4A and 4B show respectively a zoomed-in portion of a light diffuser according to the second exemplary embodiment, as light diffusion is being varied, and a simplified section view thereof showing the trajectories of light rays.

FIG. 4A illustrates a portion of the light diffuser 1 as illustrated by FIG. 3, in a section view. As can be seen in FIG. 4A, when the light diffusing element 10 is gently compressed between the first and second plate 11, 13 as denoted by the arrows, some excrescences 201a are partly crushed by the first plate 11 or the second plate 13 and are thereby flattened over the zone of contact, while other excrescences 201b are not in contact with either one of the first and second plates 11, 13. If more pressure is exerted, i.e. if the first and second plates 11, 13 are put in closer vicinity with each other, then it is likely that the flattened surface areas will be widened and that even more of the excrescences 201 will be in contact with either one of the first and second plates 11, 13. As already mentioned above and more explicitly illustrated by FIG. 4B, whatever the configuration, i.e. whatever the distance separating the first and second plates 11, 13 or the pressure exerted by them onto the two main surfaces of the light diffusing element 10, it always can be assumed that the main surfaces of the light diffusing element 10 comprise a plurality of cavities that have different shapes and sizes or internal volumes.

Now in reference to FIG. 4B, one first light ray 401 and one second light ray 402 are depicted, having different trajectory as they are passing through the different materials forming the light diffuser 1. It shall be understood that the configurations described below, the direction of light rays, the described materials and respective refractive indices are merely given as examples, and are in no way limiting the present invention. The light trajectories illustrated in FIG. 4B are given by way of examples, for the sake of a better understanding of the invention, and may not exactly correspond to actual trajectories.

The first light ray 401 first passes through a medium typically comprising air, thus having a refractive index of 1. Then the first light ray penetrates into a medium consisting of the material that forms the second plate 13, which for is for instance transparent glass having a refractive index of 1.52, with a given angle of incidence. The difference between the refractive index of air and the refractive index of the material forming the second plate 13 induces a deviation of the direction of the first light ray 401. The first light ray 401 then penetrates into the medium consisting of the material forming the light diffusing element 10, for example transparent silicone rubber having a refractive index of 1.41. The difference between the refractive index of glass and that of silicone rubber in turn induces a deviation of the first light ray 401. The first light ray 401 then penetrates into the medium consisting of the material forming the first plate 11, for example glass with a refractive index of 1.52. The difference between the refractive index of silicone rubber and that of glass in turn induces a deviation of the first light ray 401. Eventually, the first light ray 401 exits the light diffuser 1, in other words it penetrates into the air, and the difference between the refractive index of glass and that of air in turn induces a deviation of the first light ray 401. In total, the first light ray 401 has undergone a deviation that basically corresponds to the summed up deviations induced by the differences in refractive indices of all the media passed through by the first light ray 401.

Similarly, the second light ray successively passes through different media, namely: air, then glass, then the medium consisting of the material comprised in a first cavity 200a, i.e. typically air, then silicone rubber, then the air comprised by a third cavity 200c, then silicone rubber again, then air comprised by a fourth cavity 200d, then silicone rubber, then glass, then finally air. Note that in the exemplary illustration of FIG. 4b, the second light ray is totally reflected at the interface between the silicone rubber forming the light diffusing element 10 and a second air cavity 200b, due to the incidence angle it has upon arrival onto such interface, and the respective refractive indices of the two materials involved, namely silicone rubber and air. In total, the second light ray 402 has undergone a deviation that basically corresponds to the summed up deviations induced by the differences in refractive indices of all the media passed through by the second light ray 402.

Figure 5A:
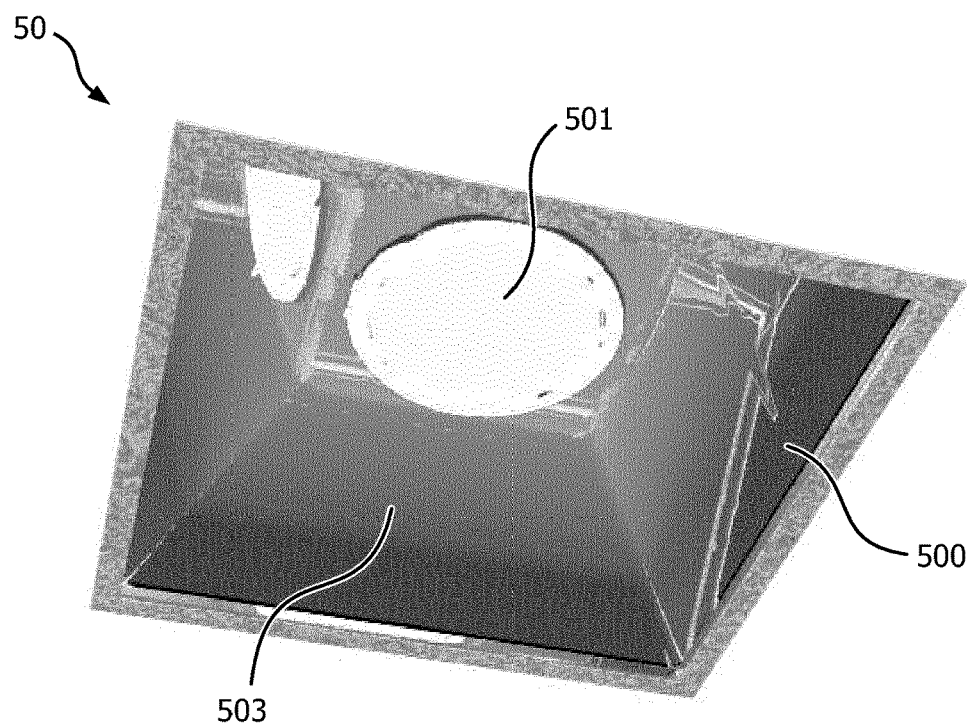
FIGS. 5A and 5B show a luminaire, respectively not comprising a light diffuser, and comprising a light diffuser as in the second exemplary embodiment of the invention.
Figure 5B:
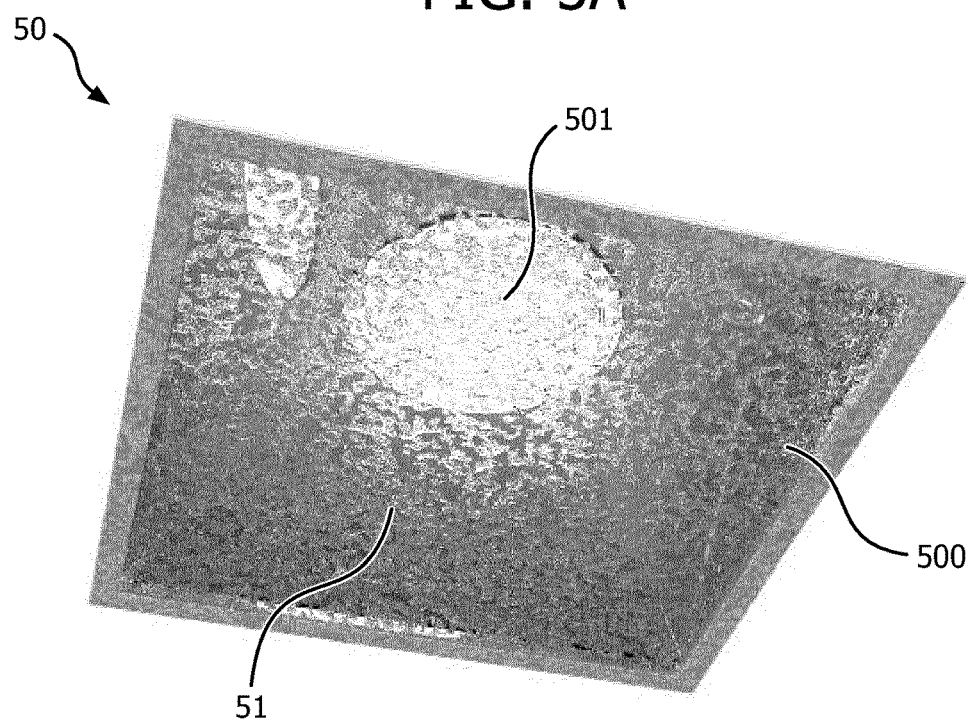

FIGS. 5A and 5B show a luminaire, respectively not comprising a light diffuser, and comprising a light diffuser as in the second exemplary embodiment of the invention.

In reference to FIG. 5A, a luminaire 50 can comprise a light source 501, for example comprising a plurality of light emitting elements such as Light Emitting Diodes, commonly designated by the acronym LED, which are mounted on a substrate that also comprises electronic components adapted to drive the LEDs with appropriate currents.

The luminaire 50 also comprises a housing 500 to which the light source 501 is attached. The housing 500 can further comprise a reflector adapted to reflect light and adapt the light beam to the application needs. The luminaire 50 as illustrated by FIG. 5A has a structure that is well known and does not comprise any light diffuser, but merely a screen 503 that can possibly be adapted to diffuse light uniformly.

In contrast, the luminaire 50 as illustrated by FIG. 5B has an overall structure corresponding to the luminaire described above in reference to FIG. 4A, but comprises a light diffuser 51 with a structure that corresponds, in the illustrated example, to the second embodiment described above in reference to FIGS. 3, 4A and 4B. The light diffuser 51 can be provided in place of the screen 503 as depicted by FIG. 5A, or may be provided additionally to the screen 503.

Figure 6:
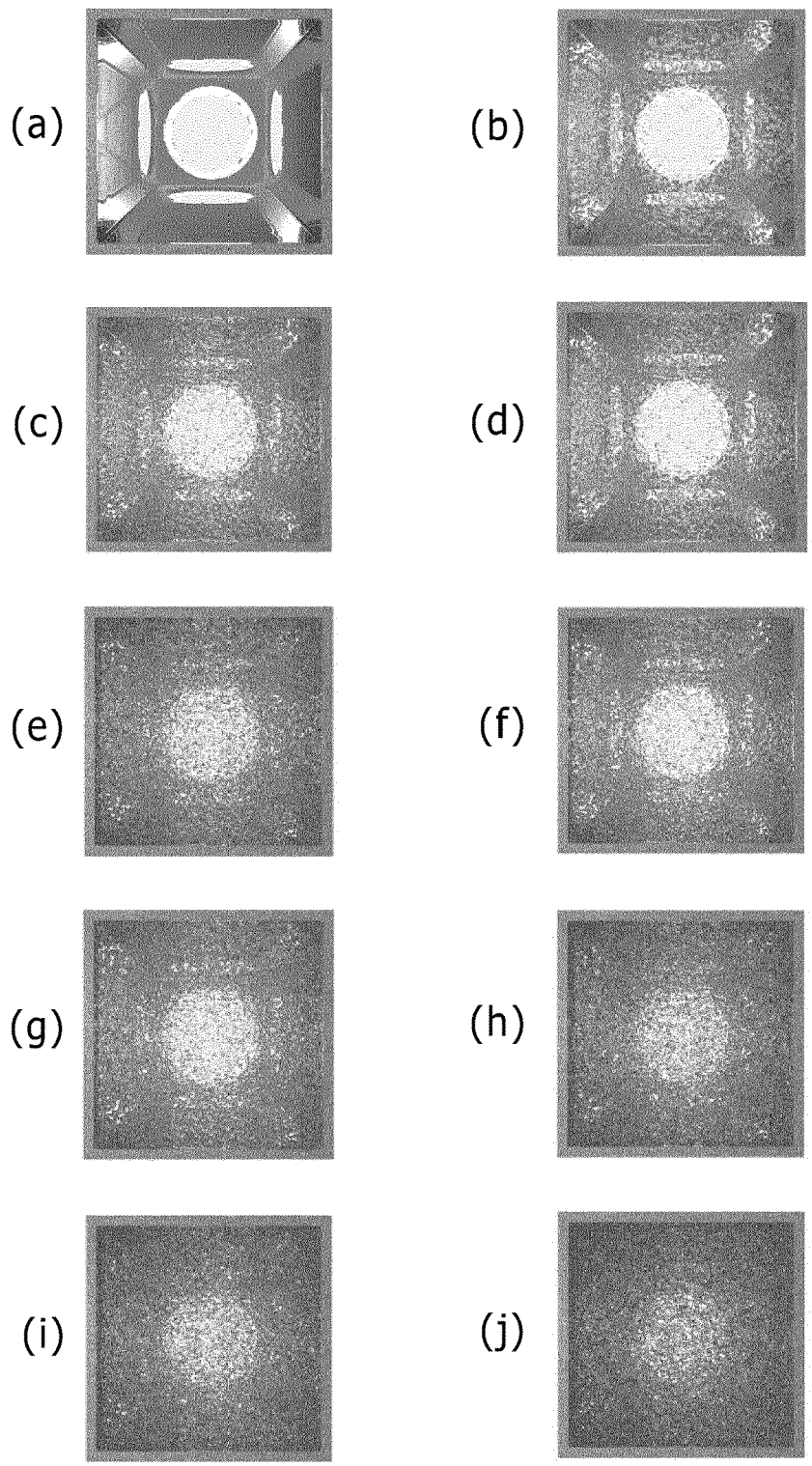
FIG. 6 shows a luminaire as illustrated by FIG. 5B, with different light diffusion settings.

As illustrated by FIG. 6, different light diffusion settings can be applied to the luminaire 50 by varying the distance between the first and second plates 11, 13 of the light diffuser 1. A first configuration (a) at the top left position in FIG. 6 corresponds to the luminaire 50 being not equipped with a light diffuser 1, in a way similar as the configuration illustrated by FIG. 5A. Then a series of 9 configurations are displayed, corresponding to a gradually reduced distance between the first and second plates of the light diffuser. As can be seen in the illustrated example, the shorter the distance between the two plates, the more diffuse the light emitted by the luminaire 50.

The first and second plates comprised by the light diffuser in all the described embodiments, can be adapted to be moved away from each other, or closer to each other, so that light diffusion properties can be varied.

For example in the luminaire 50 as illustrated in FIGS. 5A, 5B and 6, the second plate 13 can be solidly fixed to the housing 500, while the first plate 11 can be adapted to be moved related to the second plate 13. For example both plates 11, 13 can be further adapted to always remain parallel with each other, only the distance between them being allowed being varied.

In preferred embodiments, the light diffuser 1 can further comprise one or plural motive elements configured for varying the distance between said first plate 11 and second plate 13. An example of a motive element is described below in reference to FIG. 7.

Figure 7:
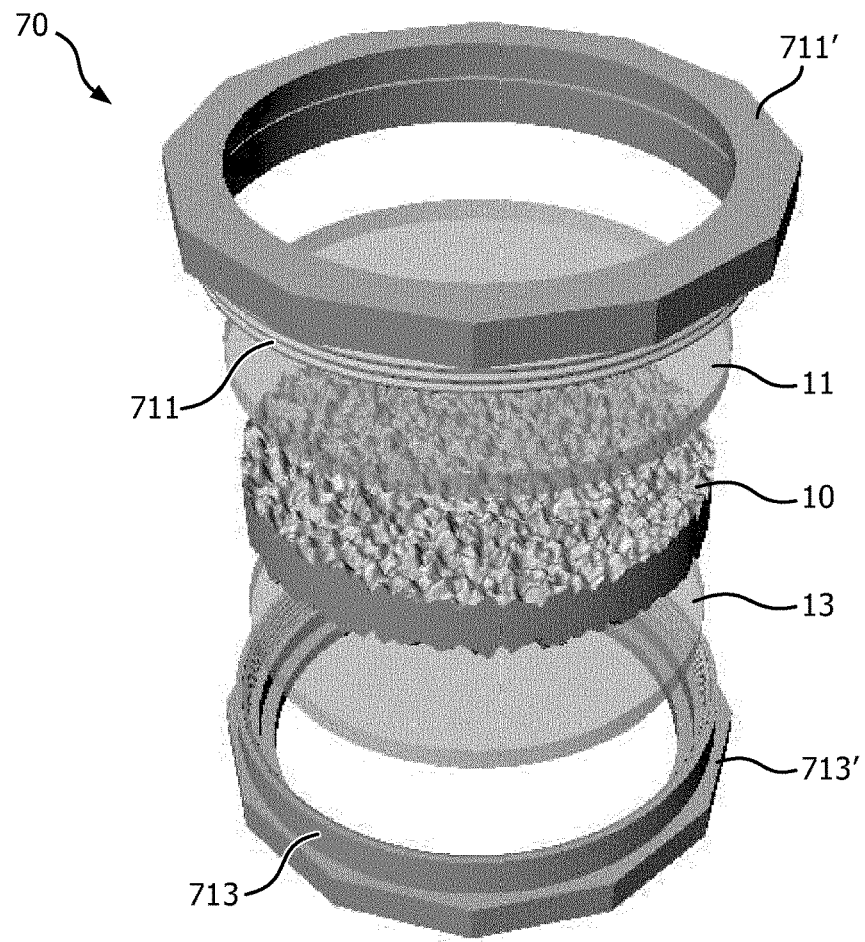
FIG. 7 shows an example of a motive element comprised by a light diffuser or a luminaire according to the invention.

As illustrated by FIG. 7, a motive element 70 can comprise two matching threaded cylinders 711, 713, a threading being realized at least over a portion of the external part of each threaded cylinder 711, 713. One first threaded cylinder 711 can be attached to the first plate 11, and one second threaded cylinder 713 can be attached to the second plate 13. The two threaded cylinders 711, 713 can have a common principal axis; thus, if one threaded cylinder is rotated with respect to the other threaded cylinder, then the distance between the two plates 11, 13 can be varied, as well as light diffusing properties of the light diffusing element 10. A threaded cylinder 711, 713 can be interlocked with the corresponding plate 11, 13.

In alternative embodiments, the threaded cylinders 711, 713 may not be purely interlocked with the respective plates 11, 13; for example, a plate 11, 13 can be mounted in a groove that is formed in the internal part of the corresponding threaded cylinder 711, 713, so that the light diffusing element 10 is not bended as the threaded cylinders 711, 713 are rotated with respect to each other, due to friction forces at the interfaces between the plates 11, 13 and the light diffusing element 10. In such a configuration, the plates 11, 13 are free to rotate with respect to the corresponding threaded cylinders 711, 713.

In other embodiments, as also illustrated by FIG. 7, at least one of the plates 11, 13 (both in the illustrated example) can be mounted in a respective base section 711', 713' that is interlocked with the corresponding threaded cylinder 711, 713, for example in a groove realized in the base section as described above. A base section can be essentially planar, and have a profile adapted to ease coupling with a rotating tool. For example, the base section can have a polygonal profile so as to allow coupling with a wrench.

In some embodiments, the threaded cylinders 711, 713 can also be made in a transparent or translucent material; the threaded cylinders 711, 713 can thus improve the cosmetic rendering of the luminaire 50.

The first threaded cylinder 711 can for example be interlocked with the housing of the luminaire in which it is mounted.

In other embodiments, not illustrated, the motive element can comprise a plurality of threaded rods, for instance four threaded rods arranged proximate with the four corners of the light diffuser if the light diffuser is essentially planar and has a substantially square or rectangle shape as in the exemplary embodiments illustrated in FIGS. 5B and 6. Of course the light diffuser may have different shapes and any other number of threaded rods may be used accordingly. The threaded rods can be threaded along their whole length or only part thereof. The threaded rods can be arranged in such a way that they pass through all the main components of the light diffuser. For example, the threaded rods can be solidly fixed to the second plate, for example by screwing, crimping gluing or any known fixation technique. Through holes can be realized through the main components of the light diffuser to let the threaded rods pass through, in such a way that the threaded rods can pass through the width of the second plate, the width of the light diffusing element and the width of the first plate, with at least one end of the threaded rods extended beyond the external surface of the first plate. The threaded portion of any of the threaded rods is at least extending up to the end of the threaded rods that extend beyond the external surface of the first plate. Hence, nuts can be screwed around the threaded portion of the respective threaded rods, and tightening or untightening of the nuts can allow a human user to adjust the distance between the first and second plates.

In a preferred embodiment, the threaded rods can be surrounded by respective cylinders, for example made in a transparent or translucent material. The cylinders can thus improve the cosmetic rendering of the luminaire, while ensuring a better mechanical positioning and cohesion of all the components comprised by the light diffuser or luminaire.

In alternative embodiments, cylinders, possibly translucent or transparent and comprising an inner threaded portion can be used instead of the threaded rods, and screws can be used in place of the nuts for allowing the adjustment of the light diffusion properties.

In the embodiments described above, the motive element 70 can further comprise a motor engine so that the distance between the first and two plates 11, 13 can be automatically adjusted without requiring any physical efforts by a human being.

In other embodiments, a luminaire such as the luminaire 50 described above in reference to FIGS. 5B and 6, can comprise such motive element 70. If the luminaire 50 further comprise a motor engine, then associated driving circuitry and power supply can also be comprised by the structure of the luminaire 50.

In the embodiments described above, the luminaire 50 can further comprise communication means, for example wireless connection means, such as a Zygbee, Bluetooth or WiFi communication module, so that appropriate command signals can be received from a remote command device, and translated into signals for adjusting operation of the motor engine through varying the operating parameters of the associated driving circuits, so that the light diffusion properties can be adjusted accordingly with commands sent by a user by means of the remote control unit.

Figure 8:
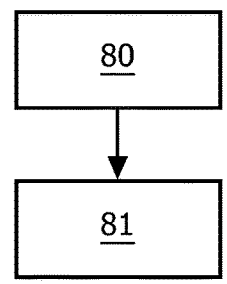
FIG. 8 shows a method for varying the diffusion properties of light passing through a light diffuser, according to an aspect of the present invention.

Another aspect of the invention is a method for varying the diffusion properties of light passing through a light diffuser, which is illustrated by FIG. 8.

A method for varying the diffusion properties of light passing through a light diffuser according to the present invention can comprise a step 80 of providing a light diffuser that comprises a light diffusing element having a first main surface coupled with a first rigid translucent plate and a second main surface coupled with a second rigid translucent plate, at least one of said main surfaces of the light diffusing element comprising a plurality of cavities or excrescences, followed by a step 81 of varying the distance between said first plate and said second plate, thereby varying light diffusion properties of the light diffuser.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A light diffuser comprising a light diffusing element, wherein the light diffusing element comprises a flexible translucent material, the light diffuser comprising a first plate and a second plate and a motive element configured for varying the distance between said first plate and second plate, said first and second plates being rigid and translucent, the light diffusing element being arranged between said first and second plates in such a way that one first main surface of the light diffusing element is coupled with the first plate, and one second main surface of the light diffusing element is coupled with the second plate, at least one of said first or second surface comprising a plurality of cavities and/or excrescences, wherein the first and second plates are adapted to be moved closer to or further away from each other, so that light diffusion properties of the light diffuser are varied.

2. A light diffuser as claimed in claim 1, wherein at least one of said first or second face comprises a plurality of cavities of random depth and/or excrescences of random height.

3. A light diffuser as claimed in claim 1, wherein the flexible translucent material comprises silicone rubber.

4. A light diffuser as claimed in claim 1, wherein said first and second plates are made with glass.

5. A light diffuser as claimed in claim 1, wherein said first and second plates are essentially planar.

6. A light diffuser as claimed in claim 1, wherein at least one of said first or second plate has a lens shape.

7. A light diffuser as claimed in claim 1, wherein said motive element comprises a first threaded cylinder attached to the first plate, and a second threaded cylinder attached to the second plate, the threaded cylinders comprising matching threading portions.

8. A luminaire comprising a housing, a light source, and a light diffuser as claimed in claim 1.

9. A luminaire comprising a housing, a light source, and a light diffuser as claimed in claim 7, the luminaire further comprising a motor engine for varying the distance between the first and second plates.

10. A luminaire as claimed in claim 9, further comprising a driving circuitry and a power supply for operating at least the motor engine.

11. A luminaire as claimed in claim 10, further comprising communication receiving device to receive control signals for adjusting operation of the motor engine through varying the operating parameters of the driving circuitry.

12. Method for varying the diffusion properties of light passing through the light diffuser as claimed in claim 1, comprising the steps of:
   a. providing the light diffuser comprising a light diffusing element having a first main surface coupled with a first rigid translucent plate and a second main surface coupled with a second rigid translucent plate, at least one of said main surfaces of the light diffusing element comprising a plurality of cavities or excrescences;
   b. varying the distance between said first plate and said second plate, thereby varying light diffusion properties of the light diffuser.

13. A light diffuser comprising a light diffusing element, wherein the light diffusing element comprises a flexible translucent material, the light diffuser comprising a first plate and a second plate and first and second cylinders or rods coupled to the first and second plates to enable varying the distance between said first plate and second plate, said first and second plates being rigid and translucent, the light diffusing element being arranged between said first and second plates in such a way that one first main surface of the light diffusing element is coupled with the first plate, and one second main surface of the light diffusing element is coupled with the second plate, at least one of said first or second surface comprising a plurality of cavities and/or excrescences, wherein the first and second plates are adapted to be moved closer to or further away from each other, so that light diffusion properties of the light diffuser are varied.

* * * * *